United States Patent
Tan et al.

(10) Patent No.: US 8,582,693 B2
(45) Date of Patent: Nov. 12, 2013

(54) WIRELESS RECEIVER APPLICABLE TO MULTIPLE COEXISTING POSITIONING SYSTEMS

(75) Inventors: Chun-Geik Tan, Singapore (SG); Wei-Min Shu, Singapore (SG); Chi-Hsueh Wang, Kaohsiung (TW)

(73) Assignee: Mediatek Singapore PTE. Ltd., Singapore (SG)

( * ) Notice: Subject to any disclaimer, the term of this patent is extended or adjusted under 35 U.S.C. 154(b) by 18 days.

(21) Appl. No.: 13/309,908

(22) Filed: Dec. 2, 2011

(65) Prior Publication Data

US 2013/0034190 A1 Feb. 7, 2013

Related U.S. Application Data

(60) Provisional application No. 61/514,979, filed on Aug. 4, 2011.

(51) Int. Cl.
- *H04L 27/00* (2006.01)
- *G01S 1/00* (2006.01)
- *G01S 19/00* (2010.01)
- *G01S 19/33* (2010.01)
- *G01S 19/01* (2010.01)

(52) U.S. Cl.
USPC ........... 375/324; 375/322; 375/316; 342/350; 342/352; 342/357.2; 342/357.39; 342/357.51; 342/357.73

(58) Field of Classification Search
USPC ....................... 342/357.12, 350; 375/316, 324
See application file for complete search history.

(56) References Cited

U.S. PATENT DOCUMENTS

| | | | |
|---|---|---|---|
| 4,472,685 A * | 9/1984 | Dutasta | 329/325 |
| 6,856,794 B1 | 2/2005 | Tso et al. | |
| 7,130,599 B2 | 10/2006 | Persico et al. | |
| 8,120,531 B2 | 2/2012 | Yang et al. | |
| 2006/0262230 A1 | 11/2006 | Ookubo et al. | |
| 2009/0160704 A1* | 6/2009 | Zhao et al. | 342/357.12 |
| 2009/0189808 A1* | 7/2009 | Chen | 342/357.12 |
| 2010/0141519 A1 | 6/2010 | Rodal | |
| 2011/0122974 A1 | 5/2011 | Sundstrom et al. | |
| 2012/0194384 A1 | 8/2012 | Reis et al. | |
| 2013/0039444 A1 | 2/2013 | Porret et al. | |
| 2013/0155748 A1 | 6/2013 | Sundstrom et al. | |

OTHER PUBLICATIONS

Roman Kuc, Introduction to Digital Signal Processing, 2008 reprint of 1982 original, BS Publications, pp. 102-103.*
U.S. Appl. No. 13/073,996.

(Continued)

*Primary Examiner* — Chieh M Fan
*Assistant Examiner* — Michelle M Koeth
(74) *Attorney, Agent, or Firm* — McClure, Qualey & Rodack, LLP

(57) ABSTRACT

Wireless receiver for receiving a plurality of co-existing wireless signals respectively from different positioning systems, includes an analog frontend and an analog-to-digital converting unit. The analog frontend is arranged to convert bands of the co-existing wireless signals into a plurality of corresponding intermediate bands by a local frequency and to provide an intermediate signal including the intermediate bands. The analog-to-digital converting unit is coupled to the analog frontend, and is arranged to convert the intermediate signal to a digital signal, wherein an operation band of the analog-to-digital converting unit covers the plurality of intermediate bands.

18 Claims, 3 Drawing Sheets

(56) References Cited

OTHER PUBLICATIONS

Utsurogi, Y., et al.; "CMOS Front-End Circuits of Dual-Band GPS Receiver," IEICE Trans. Electron.; vol. E88-C; No. 6; Jun. 2005; pp. 1275-1279.

Behbahabi, F., et al.; "CMOS Mixers and Polyphase Filters for Large Image Rejection;" IEEE Journal of Solid-State Circuits; vol. 36; No. 6; Jun. 2001; pp. 873-887.

Non-Final Office Action issued by the USPTO for U.S. Appl. No. 13/073,996, filed Mar. 28, 2011.

\* cited by examiner

WIRELESS RECEIVER APPLICABLE TO MULTIPLE COEXISTING POSITIONING SYSTEMS

This application claims the benefit of U.S. provisional patent application No. 61/514,979, filed Aug. 4, 2011, the subject matter of which is incorporated herein by reference.

FIELD OF THE INVENTION

The present invention relates to wireless receiver, and more particularly, to wireless receiver for receiving co-existing wireless signals from different positioning systems with a single-path analog frontend.

BACKGROUND OF THE INVENTION

Wireless positioning system, such as satellite positioning system, enables a receiver to locate its own position by referring to a plurality of transmitters, e.g., satellites, of the wireless positioning system. Each of the transmitters broadcasts unique data and/or messages carried in a wireless signal. The data/messages of a transmitter are related to location of the transmitter, also allow the receiver to determine a distance from the receiver to the transmitter. As the receiver receives the wireless signals from multiple transmitters, the receiver distinguishes data of each transmitter, calculates a relative distance from the receiver to each transmitter according to the data, and finally resolves position of the receiver itself according to relative distances respectively from the multiple transmitters; a position information can then be provided to reflect position of the receiver itself.

SUMMARY OF THE INVENTION

Currently, several independent satellite positioning systems have been established to provide positioning services, such as GPS (Global Positioning System), GLONASS, BEIDOU and Galileo. For demands of faster (e.g., shorter time-to-first-fix) and more accurate positioning, a receiver capable of integrating data provided by multiple positioning systems is desired. Generally, a receiver includes an analog frontend arranged to receive wireless signals of radio frequency (RF), down-convert the RF signals to signal of intermediate frequency (IF) by mixing the RF signals with local oscillation signal(s) and low-pass filtering the mixed signals. However, because different positioning systems respectively apply wireless signals of different frequency bands to carry data/messages, hardware cost, complexity and power consumption tend to increase if a multi-path analog frontend, which separates bands of different positioning systems to different analog signals, is adopted.

An embodiment of the invention is providing a wireless receiver for receiving a plurality of co-existing wireless signals from different positioning systems; the wireless receiver includes an analog frontend, an analog-to-digital converting unit and a digital block. The analog frontend is arranged to convert bands of the plurality of co-existing wireless signals into a plurality of corresponding intermediate bands by a local frequency, and to provide an intermediate signal including the plurality of intermediate bands. The analog-to-digital converting unit is coupled to the analog frontend, and is arranged to convert the intermediate signal to a digital signal, wherein an operation band of the analog-to-digital converting unit covers the plurality of intermediate bands. The digital block is coupled to the analog-to-digital converting unit, and is arranged to implement a plurality of digital mixers respectively corresponding to the different positioning systems; each of the digital mixers is arranged to retrieve a baseband signal in response to one of the plurality of intermediate bands. In an embodiment, the local frequency is between a maximum frequency and a minimum frequency of the plurality of intermediate bands.

In an embodiment, the analog frontend includes a mixer and a low pass filter. The mixer is arranged to mix the plurality of the co-existing wireless signals with a local oscillation signal of the local frequency to provide a mixed signal. The low pass filter is coupled to the mixer, and is arranged to filter the mixed signal to provide the intermediate signal. In an embodiment, a bandwidth of the low pass filter covers the plurality of intermediate bands.

In an embodiment, the digital block further includes a processing portion for providing a location information in response to data respectively embedded in the retrieved baseband signals. The processing portion is further arranged to process the retrieved baseband signals by spreading codes of the different positioning systems to obtain the data, since data of different positioning systems are coded by different spreading codes to be distinguished form each other.

The plurality of intermediate bands includes a plurality of I-branch intermediate bands and a plurality of Q-branch intermediate bands, with a relative phase difference between the I-branch intermediate bands and the Q-branch intermediate bands. Correspondingly, the intermediate signal includes an I-branch intermediate signal and a Q-branch intermediate signal respectively comprising the plurality of I-branch intermediate bands and the plurality of Q-branch intermediate bands, and the digital signal includes an I-branch digital signal and a Q-branch signal.

For down-conversion of I-branch and Q-branch, the analog frontend includes an I-branch mixer, a Q-branch mixer, an I-branch low pass filter and a Q-branch low pass filter. To cooperate with the analog frontend, the analog-to-digital converting unit includes an I-branch analog-to-digital converter (ADC) and a Q-branch ADC.

The I-branch mixer and the Q-branch mixer are arranged to mix the co-existing wireless signals respectively with an I-branch local oscillation signal and a Q-branch local oscillation signal, and to provide an I-branch mixed signal and a Q-branch mixed signal in response. A frequency of the I-branch local oscillation signal equals the local frequency, a frequency of the Q-branch local oscillation signal also equals the local frequency, and phase difference between phases of the I-branch local oscillation signal and the Q-branch local oscillation signal equals the relative phase difference, e.g., 90 degrees.

The I-branch low pass filter is coupled to the I-branch mixer, and is arranged to filter the I-branch mixed signal to provide the I-branch intermediate signal. Similarly, the Q-branch low pass filter is coupled to the Q-branch mixer, and is arranged to filter the Q-branch mixed signal to provide the Q-branch intermediate signal. In an embodiment, the I-branch low pass filter and the Q-branch low pass filter are active real low pass filters equipped with programmable gain control functionality.

The I-branch ADC is arranged to convert the I-branch intermediate signal to the I-branch digital signal, and the Q-branch ADC is arranged to convert the Q-branch intermediate signal to the Q-branch digital signal. Operation bands of both the I-branch ADC and the Q-branch ADC cover the plurality of intermediate bands.

In association with the I-branch and the Q-branch, the digital block is coupled to the I-branch ADC and the Q-branch ADC, and includes a mixing portion and a processing portion.

The mixing portion is arranged to retrieve a plurality of I-branch baseband signals respectively corresponding to the plurality of positioning systems, and to retrieve a plurality of Q-branch baseband signals respectively corresponding to the plurality of positioning systems. The processing portion is arranged to map a first one of the I-branch baseband signals and a first one of the Q-branch baseband signals respectively to a real portion and an imaginary portion of a first constellation, and to map a second one of the I-branch baseband signals and a second one of the Q-branch baseband signals respectively to a real portion and a negative imaginary portion of a second constellation.

Another embodiment of the invention is providing a wireless receiver for receiving a plurality of co-existing wireless signals from different positioning systems; the wireless receiver includes a mixer, a low pass filter, an analog-to-digital converting unit and a digital block. The mixer is arranged to mix the plurality of the co-existing wireless signals with a local oscillation signal of a local frequency to provide a mixed signal. The low pass filter is coupled to the mixer, and is arranged to filter the mixed signal to provide an intermediate signal; the intermediate signal includes a plurality of intermediate bands respectively converted from bands of the plurality of co-existing wireless signals by the local frequency. The analog-to-digital converting unit is coupled to the low pass filter, and is arranged to convert the intermediate signal to a digital signal, wherein an operation band of the analog-to-digital converting unit covers the plurality of intermediate bands. The digital block is coupled to the analog-to-digital converting unit, and is arranged to retrieve a plurality of baseband signals respectively in response to the plurality of intermediate bands.

Still another objective of the embodiment is providing a wireless receiver for receiving a plurality of co-existing wireless signals respectively from different positioning systems. The wireless receiver including an I-branch mixer, a Q-branch mixer, an I-branch low pass filter, a Q-branch low pass filter, an I-branch ADC, a Q-branch ADC and a digital block.

The I-branch mixer is arranged to mix the plurality of the co-existing wireless signals with an I-branch local oscillation signal of a local frequency to provide an I-branch mixed signal. The Q-branch mixer is arranged to mix the plurality of the co-existing wireless signals with a Q-branch local oscillation signal of the local frequency to provide a Q-branch mixed signal. A phase of the I-branch local oscillation signal is different from that of the Q-branch local oscillation signal, e.g., by 90 degrees.

The I-branch low pass filter is coupled to the I-branch mixer, and is arranged to filter the I-branch mixed signal to provide an I-branch intermediate signal, which includes a plurality of I-branch intermediate bands respectively converted from bands of the plurality of co-existing wireless signals by the I-branch local oscillation signal. The Q-branch low pass filter is coupled to the Q-branch mixer, and is arranged to filter the Q-branch mixed signal to provide a Q-branch intermediate signal, which includes a plurality of Q-branch intermediate bands respectively converted from the bands of the plurality of co-existing wireless signals by the Q-branch local oscillation signal.

The I-branch ADC is arranged to convert the I-branch intermediate signal to an I-branch digital signal. Similarly, the Q-branch ADC is arranged to convert the Q-branch intermediate signal to a Q-branch digital signal.

The digital block is coupled to the I-branch ADC and the Q-branch ADC, and is arranged to retrieve a plurality of I-branch baseband signals respectively corresponding to the plurality of positioning systems from the I-branch digital signal, and retrieving a plurality of Q-branch baseband signals respectively corresponding to the plurality of positioning systems from the Q-branch digital signal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
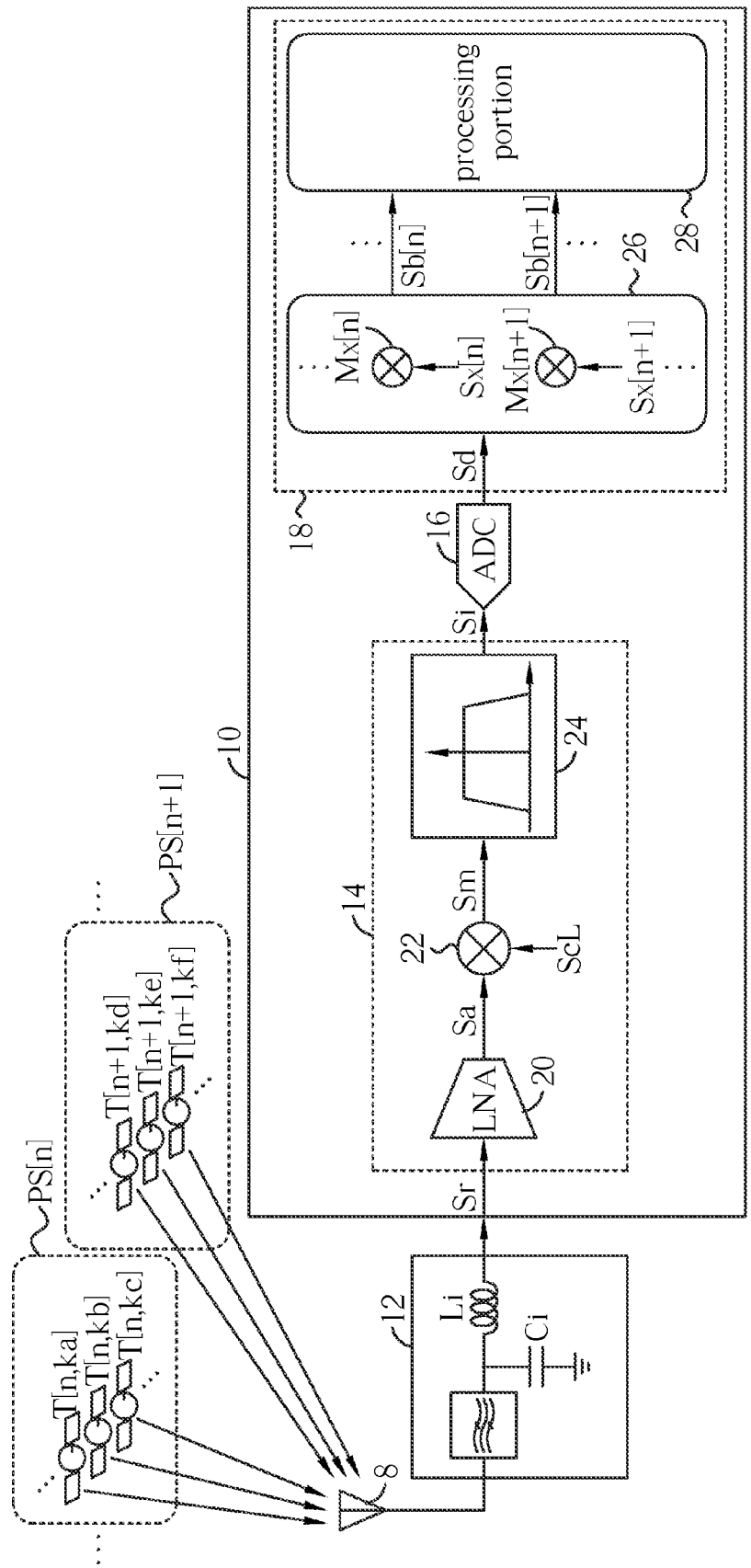
FIG. 1 illustrates a receiver according to an embodiment of the invention.

Please refer to FIG. 1 illustrating a receiver 10 according to an embodiment of the invention. The receiver 10, as a wireless receiver, works in cooperation with an antenna 8 and a receiving module 12 to receive co-existing wireless signal from multiple different positioning systems, such as positioning systems PS[n] and PS[n+1]. The positioning system PS[n] includes transmitters T[n,ka], T[n,kb] and T[n,kc], etc; similarly, the positioning system includes transmitters T[n+1, kd], T[n+1,ke] and T[n+1,kf], etc. Each transmitter, e.g., a satellite, simultaneously broadcasts unique data (messages) carried in a wireless signal, wherein the data of a transmitter, for example, include information about location of the transmitter, and allow the receiver 10 to determine a distance from the receiver to the transmitter. Please also refer to FIG. 2, where frequency bands used by wireless signals of different positioning systems are illustrated. The wireless signals sent by the transmitters of the positioning system PS[n] utilize a band Br[n], and the wireless signals sent by the transmitters of the positioning system PS[n+1] occupy a band Br[n+1]. The band Br[n] can be characterized by a minimum frequency Lf[n], a maximum frequency Uf[n] and a central frequency fc[n]; similarly, the band Br[n+1] centers at a frequency fc[n+1], and expands from a minimum frequency Lf[n+1] to a maximum frequency Uf[n+1]. Though the bands Br[n] and Br[n+1] are shown as two separate bands in FIG. 2, the bands Br[n] and Br[n+1] can partially overlap. For example, the frequency Uf[n] of the band Br[n] can be greater than the frequency Lf[n+1] of the band Br[n+1]. Or, one of the bands Br[n] and Br[n+1] can be fully covered by another band; for example, the frequency Lf[n] can be greater than or equal to the frequency Lf[n+1], and the frequency Uf[n] can be less than or equal to the frequency Uf[n+1].

To determine location of the receiver 10 itself, the co-existing wireless signals sent by the transmitters of the positioning systems are received by the antenna 8, and are transmitted to the receiver 10 as a signal Sr through the receiving module 12, such that the signal Sr includes the bands Br[n] and Br[n+1] in the frequency domain. The receiving module 12 may include, for example, an inductor Li, a capacitor Ci and/or band-pass filtering element. The receiver 10 includes an analog frontend 14, an analog-to-digital converting unit 16 and a digital block 18.

The analog frontend 14 is arranged to respectively convert the bands Br[n] and Br[n+1] of the co-existing wireless signals into corresponding intermediate bands Bm[n] and Bm[n+1] (FIG. 2) by a local frequency fcL of a local oscillation signal ScL, and to provide an intermediate signal Si (FIG. 1) including the intermediate bands Bm[n] and Bm[n+1].

The analog-to-digital converting unit 16 is coupled to the analog frontend 14, and is arranged to convert the intermediate signal Si to a digital signal Sd, wherein an operation band Bop (FIG. 2) of the analog-to-digital converting unit 16 covers the intermediate bands Bm[n] and Bm[n+1]. For example, the analog-to-digital converting unit 16 is arranged to properly sample the signal Si with a sampling rate high enough for the operation band Bop.

As shown in FIG. 1, the analog frontend 16 includes an amplifier 20, a mixer 22 and a low pass filter 24. The amplifier 20, e.g., a Low-Noise Amplifier (LNA) of high linearity, is coupled to the signal Sr and is arranged to amplify the signal Sr to an amplified signal Sa; therefore, the signal Sa also includes the bands Br[n] and Br[n+1] in the frequency domain. The mixer 22 is arranged to mix the signal Sa with the local oscillation signal ScL of the local frequency fcL to provide a mixed signal Sm. In an embodiment, the local frequency fcL is between a maximum frequency and a minimum frequency of the intermediate bands Br[n] and Br[n+1]. For the example shown in FIG. 2, the local frequency ScL can be set between (e.g., in the middle of) a minimum and a maximum of the four boundary frequencies Uf[n+1], Lf[n+1], Uf[n] and Lf[n].

Figure 2:
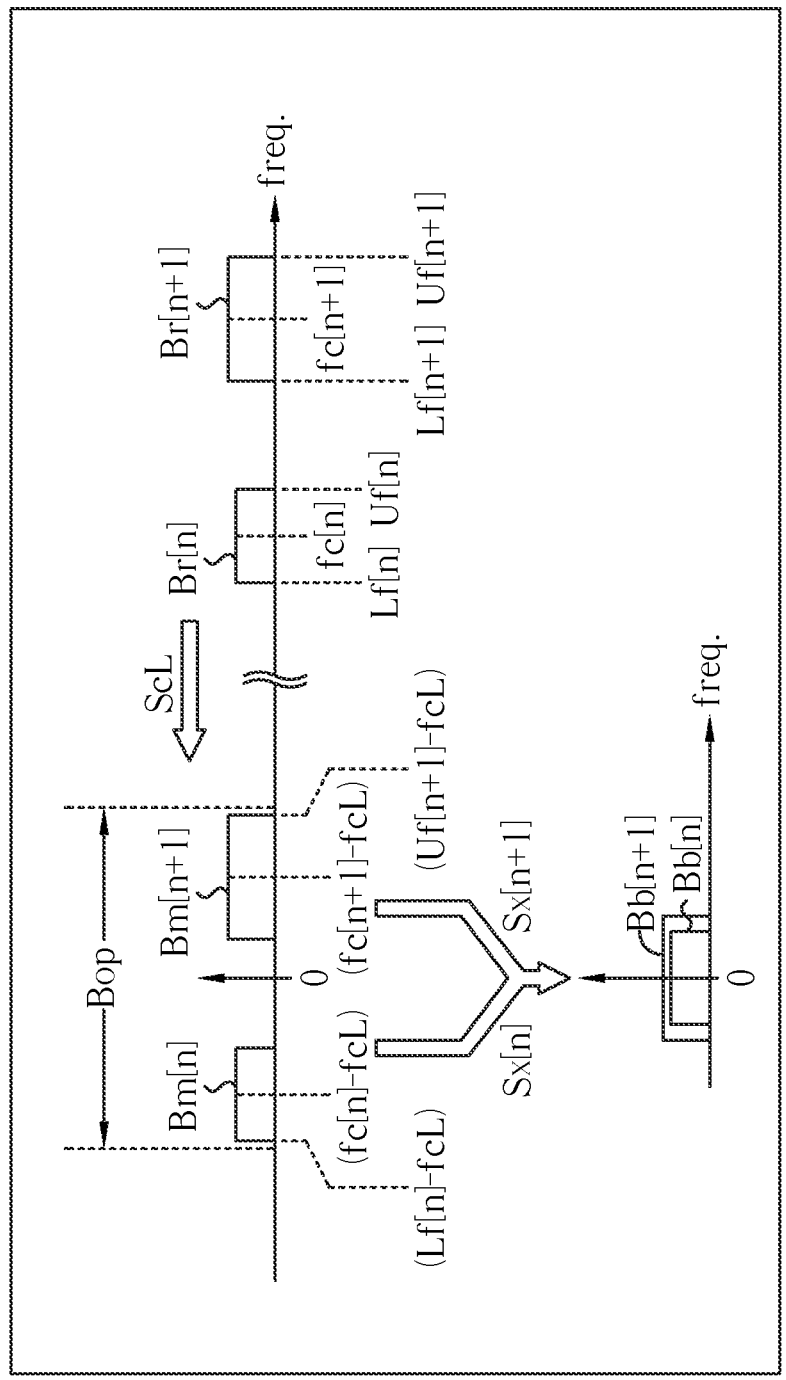
FIG. 2 illustrates operation band arrangement of receiver according to an embodiment of the invention.

The low pass filter 24 is coupled to the mixer 22, and is arranged to filter the mixed signal Sm to provide the intermediate signal Si, such that the Si includes the intermediate bands Bm[n] and Bm[n+1] down-converted from the bands Br[n] and Br[n+1]. As shown in FIG. 2, through operation of the analog frontend 14, the intermediate bands Bm[n] and Bm[n+1] are shifted along the frequency axis toward a lower end by an amount of the local frequency fcL. In an embodiment, a bandwidth of the low pass filter 24 covers the intermediate bands Bm[n] and Bm[n+1]; for example, the bandwidth of the low pass filter 24 can be the band Bop.

The digital block 18 is coupled to the analog-to-digital converting unit 16, and includes a mixing portion 26 and a processing portion 28. As the analog-to-digital converting unit 16 converts the analog intermediate signal Si to the digital signal Sd, the mixing portion 26 is arranged to implement digital mixers Mx[n] and Mx[n+1] respectively corresponding to the positioning systems PS[n] and PS[n+1]. The digital mixers Mx[n] and Mx[n+1] are arranged to respectively retrieve baseband signals Sb[n] and Sb[n+1] in response to the intermediate bands Bm[n] and Bm[n+1] embedded in the digital signal Sd, by equivalently mixing the digital signal Sd with signals Sx[n] and Sx[n+1], respectively. As shown in FIG. 2, a frequency of the signal Sx[n] can be set according to a difference (fc[n]−fcL), so the intermediate band Bm[n] is converted to a band Bb[n] in the baseband signal Sb[n]. Similarly, a frequency of the signal Sx[n+1] can be determined by a difference (fc[n+1]−fcL), such that the intermediate band Bm[n+1] is converted to a band Bb[n+1] in the baseband signal Sb[n+1].

The processing portion 28 is arranged to provide a location information in response to data respectively embedded in the retrieved baseband signals Sb[n] and Sb[n+1]. For example, the processing portion 28 can be arranged to process the retrieved baseband signals Sb[n] and Sb[n+1] by unique spreading codes of the positioning systems PS[n] and PS[n+1] to obtain the data, since data of different positioning systems are coded by different spreading codes to be distinguished form each other. As data of different transmitters of different positioning systems are distinguished and obtained, the process portion 28 can evaluate individual distance between the receiver 10 and each of the transmitter, and obtain location of the receiver 10 by geometric intersection of the distances from the transmitters.

Instead of using a multi-path analog frontend to separate baseband or IF signals of different positioning systems by analog, a single-path analog frontend is adopted in the embodiments of the invention, so baseband signals of different positioning systems are separated digitally by the digital block; the analog frontend 14 functions while signals of different positioning systems are still included in an single analog signal. With such architecture, hardware complexity, cost and power consumption of the analog frontend as well as the overall receiver can be effectively reduced, since digital processing can be implemented with lower hardware complexity and consumes less power.

For transmitting digital data in a wireless signal, bits of the data are mapped to a real portion and an imaginary portion of a constellation, so the real portion is transmitted by an in-phase oscillation signal (carrier) as an I-branch portion of the wireless signal, and the imaginary portion is transmitted by a quadrature-phase oscillation signal as a Q-branch portion of the wireless signal. The in-phase oscillation signal and the quadrature-phase oscillation signal are of a same frequency, but are of a phase difference of 90 degrees. In an embodiment of the receiver 10, separation of the I-branch portion and the Q-branch portion can be left to be processed by the digital block 18. That is, the analog frontend 14 functions while I-branch portions and Q-branch portions of signals of different transmitters are still included in a single analog signal.

Figure 3:
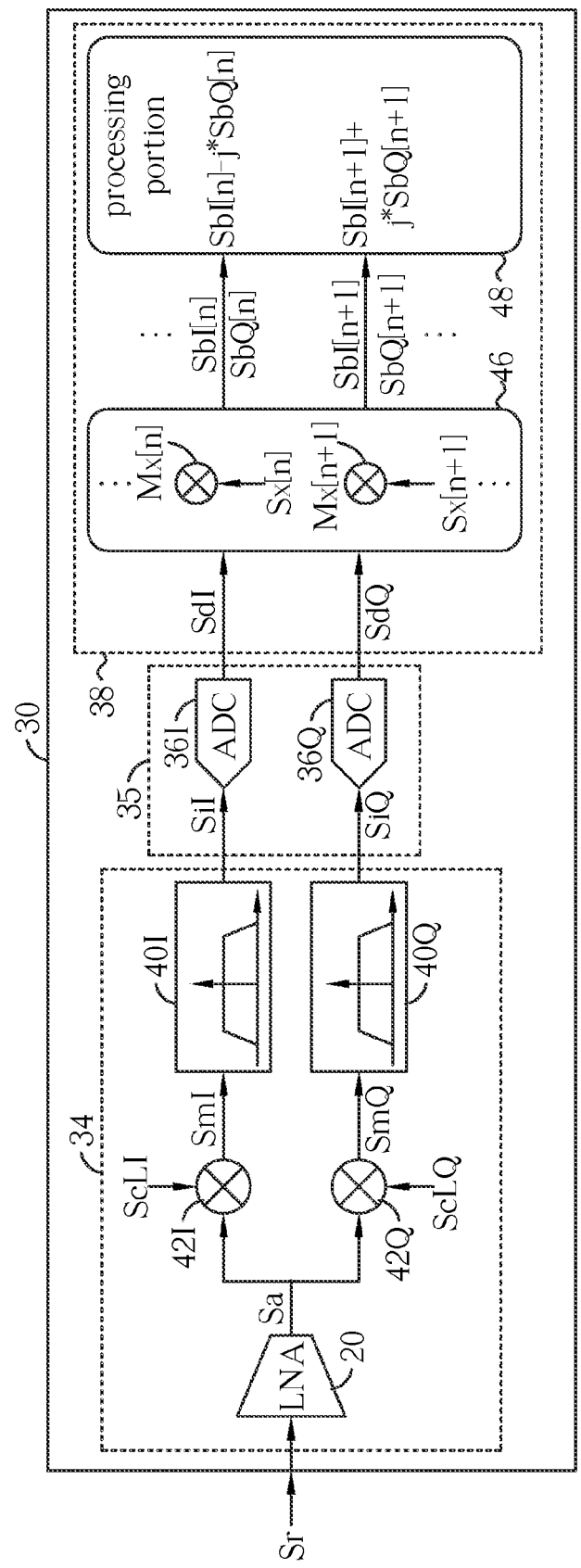
FIG. 3 illustrates a receiver according to an embodiment of the invention.

Please refer to FIG. 3 illustrating a receiver 30 according to an embodiment of the invention. The receiver 30 receives a signal Sr which includes a plurality of co-existing wireless signals from transmitters of different positioning systems, and includes an analog frontend 34, an analog-to-digital converting unit 35 and a digital block 38. The analog frontend 34 includes an amplifier 20, an I-branch mixer 42I, a Q-branch mixer 42Q, an I-branch low pass filter 40I and a Q-branch low pass filter 40Q. The analog-to-digital converting unit 35 includes an I-branch ADC 36I and a Q-branch ADC 36Q. The digital block 38 includes a mixing portion 46 and a processing portion 48.

In the analog frontend 34, the amplifier 20 amplifies the signal Sr to a signal Sa, so the signal Sa includes I-branch portions and Q-branch portions of the wireless signals broadcasted by various transmitters of positioning systems. Because I-branch portion and Q-branch portion of a signal occupy the same frequency band, I-branch portion and Q-branch portion corresponding to the positioning system PS[n] in the signal Sa both occupy the band Br[n], as shown in FIG. 2.

The I-branch mixer 42I and the Q-branch mixer 42Q are arranged to mix the signal Sa respectively with an I-branch local oscillation signal ScLI and a Q-branch local oscillation signal ScLQ, and to provide an I-branch mixed signal SmI and a Q-branch mixed signal SmQ in response. A frequency of the I-branch local oscillation signal ScLI equals the local frequency fcL (FIG. 2), a frequency of the Q-branch local oscillation signal ScLQ also equals the local frequency fcL, and phase difference between phases of the I-branch local oscillation signal and the Q-branch local oscillation signal equals the relative phase difference between the I-branch portion and the Q-branch portion, e.g., 90 degrees. Therefore, the I-branch portions in the signal Sa is separated and down-converted to the signal SmI, and the Q-branch portions in the signal Sa is isolated and down-converted to the signal SmQ.

The I-branch low pass filter 40I is coupled to the I-branch mixer 42I, and is arranged to filter the I-branch mixed signal SmI to provide an I-branch intermediate signal SiI. Similarly, the Q-branch low pass filter 40Q is coupled to the Q-branch mixer 42Q, and is arranged to filter the Q-branch mixed signal SmQ to provide a Q-branch intermediate signal SiQ. Thus, as illustrated in FIG. 2, I-branch portions originally occupying the bands Br[n] and Br[n+1] in the signal Sr are respectively shifted to I-branch intermediate bands which occupy the bands Bm[n] and Bm[n+1] in the I-branch intermediate signal SiI. Similarly, the Q-branch intermediate signal SiQ includes Q-branch portions of the positioning systems PS[n] and PS[n+1], and Q-branch intermediate bands of the Q-branch portions respectively correspond to frequency ranges of the bands Bm[n] and Bm[n+1].

The I-branch ADC 36I is coupled to the I-branch low pass filter 40I, and is arranged to convert the I-branch intermediate signal SiI to an I-branch digital signal SdI, and the Q-branch ADC 36Q, coupled to the Q-branch low pass filter 40Q, is arranged to convert the Q-branch intermediate signal SiQ to a Q-branch digital signal SdQ. As shown in FIG. 2, operation bands Bop of both the I-branch ADC 36I and the Q-branch ADC 36Q cover the intermediate bands.

In association with the I-branch and the Q-branch, the digital block 38 is coupled to the I-branch ADC 36I and the Q-branch ADC 36Q. The mixing portion 46 is arranged to retrieve I-branch baseband signals SbI[n] and SbI[n+1] respectively corresponding to the positioning systems PS[n] and PS[n+1], and to retrieve Q-branch baseband signals SbQ[n] and SbQ[n+1] respectively corresponding to the positioning systems PS[n] and PS[n+1]. For example, the mixing portion can implement digital mixers Mx[n] and Mx[n+1]. The mixer Mx[n] is arranged to equivalently mix the I-branch digital signal SdI with a signal Sx[n] of a frequency (fc[n]–fcL) to retrieve the I-branch baseband signal SbI[n], and to mix the Q-branch digital signal SdQ with the signal Sx[n] to retrieve the Q-branch baseband signal SbQ[n].

As shown in the example of FIG. 2, if the intermediate band Bm[n] of the positioning system PS[n] is converted to negative half of the frequency domain, an additional phase shift of 180 degrees is imposed in the Q-branch baseband signal SbQ[n]. Therefore, the processing portion 46 can be further arranged to map the I-branch baseband signal SbI[n] and the Q-branch baseband signal SbQ[n] respectively to a real portion and a negative imaginary portion of constellation, so data of the positioning system PS[n] can be correctly retrieved. On the other hand, because the intermediate band Bm[n+1] of the positioning system PS[n+1] remains in positive half of frequency domain, the processing portion 46 is arranged to map the I-branch baseband signal SbI[n+1] and the Q-branch baseband signal SbQ[n+1] respectively to a real portion and an imaginary portion of constellation, thus data of the positioning system PS[n+1] can be correctly retrieved.

In an embodiment, the local frequency fcL for the mixers 22, 42I and 42Q can be adjusted according to bands of positioning systems that are adopted by the receiver for locating. For example, if two positioning systems PS[n] and PS[n+1] applying bands Br[n] and Br[n+1] of minimum and maximum frequencies (Lf[n], Uf[n]) and (Lf[n+1], Uf[n+1]) are used by the receiver (the receiver 10 or 30) for positioning, the local frequency fcL for the mixers 22 or 42I and 42Q is set between a minimum and a maximum of the four boundary frequencies Uf[n+1], Lf[n+1], Uf[n] and Lf[n]. If the receiver switches to utilize only one positioning system PS[n] instead of two positioning systems, the local frequency fcL can be adjusted to be between (e.g., in middle of) the two boundary frequencies Uf[n] and Lf[n] of the band Br[n]. Dynamically changing the local frequency fcL according to band(s) used for positioning enhances reduction of power consumption since the local frequency fcL does not have to be maintained at a high value.

For example, if the receiver depends on both GPS and GLONASS for positioning, the local frequency fcL of the local oscillation signal can be set to 1588.608 MHz, since the band of GPS is centered at 1575.42 MHz with a bandwidth 2.064 MHz, and the band of GLONASS is centered at 1601.71 MHz with a bandwidth 8.34 MHz. If the receiver only relies on GPS for positioning, the local frequency fcL can be set to 1571.328 MHz. If the receiver utilizes GPS and BEIDOUu for positioning, the local frequency fcL of the local oscillation signal can be set to 1568.256 MHz, since the band of BEIDOUu is centered at 1561.098 MHz with a bandwidth 4.092 MHz.

In an embodiment, the I-branch low pass filter 40I, the Q-branch low pass filter 40Q and the low pass filter 24 in FIG. 1 are active real low pass filters equipped with programmable gain control functionality. Rather than poly-phase filters with multiple sub-bands, the low pass filters adopted in the embodiment work on a single operation band which covers bands of different positioning systems.

To sum up, because the analog frontend of the embodiments of the invention only performs signal mixing of a single local oscillation signal, power and current consumption can be effectively reduced; hardware cost and complexity can also be lowered.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless receiver for receiving a plurality of co-existing wireless signals from different positioning systems, comprising:

an analog frontend, for converting bands of the plurality of co-existing wireless signals into a plurality of corresponding intermediate bands by a local frequency, and providing an intermediate signal comprising the plurality of intermediate bands;

an analog-to-digital converting unit, coupled to the analog frontend, for converting the intermediate signal to a digital signal, wherein an operation band of the analog-to-digital converting unit covers the plurality of intermediate bands;

a mixing portion for retrieving a plurality of baseband signals corresponding to the plurality of positioning systems in response to the digital signal, wherein the baseband signals comprise a plurality of I-branch baseband signals and a plurality of Q-branch baseband signals; and a processing portion arranged to map a first one of the I-branch baseband signals and a first one of the Q-branch baseband signals respectively to a real portion and an imaginary portion of a first constellation, and to map a second one of the I-branch baseband signals and a second one of the Q-branch baseband signals respectively to a real portion and a negative imaginary portion of a second constellation.

2. The wireless receiver as claimed in claim 1, wherein the analog frontend comprises:
a mixer, for mixing the plurality of the co-existing wireless signals with a local oscillation signal of the local frequency to provide a mixed signal; and
a low pass filter, coupled to the mixer, for filtering the mixed signal to provide the intermediate signal.

3. The wireless receiver as claimed in claim 1,
wherein the mixing portion is arranged to implement a plurality of digital mixers respectively corresponding to the different positioning systems, each of the digital mixers is arranged to retrieve one of the baseband signals in response to one of the plurality of intermediate bands.

4. The wireless receiver as claimed in claim 1, wherein the processing portion is further arranged to provide a location information in response to data respectively embedded in the retrieved baseband signals.

5. The wireless receiver as claimed in claim 1, wherein the processing portion is further arranged to process the retrieved baseband signals by spreading codes of the different positioning systems to obtain the data.

6. The wireless receiver as claimed in claim 1, wherein the local frequency is between a maximum frequency and a minimum frequency of the plurality of intermediate bands.

7. The wireless receiver as claimed in claim 1, wherein the plurality of intermediate bands comprises a plurality of I-branch intermediate bands and a plurality of Q-branch intermediate bands with a relative phase difference between the I-branch intermediate bands and the Q-branch intermediate bands, the intermediate signal comprises an I-branch intermediate signal and a Q-branch intermediate signal respectively comprising the plurality of I-branch intermediate bands and the plurality of Q-branch intermediate bands, the digital signal comprises an I-branch digital signal and a Q-branch signal, and the analog-to-digital converting unit comprises:
an I-branch analog-to-digital converter, for converting the I-branch intermediate signal to the I-branch digital signal; and
a Q-branch analog-to-digital converter, for converting the Q-branch intermediate signal to the Q-branch digital signal; wherein operation bands of the I-branch analog-to-digital converter and the Q-branch analog-to-digital converter cover the plurality of intermediate bands.

8. The wireless receiver as claimed in claim 7, wherein the analog frontend comprises:
an I-branch mixer, for mixing the co-existing wireless signals with an I-branch local oscillation signal of the local frequency to provide an I-branch mixed signal;
a Q-branch mixer, for mixing the co-existing wireless signals with a Q-branch local oscillation signal of the local frequency to provide a Q-branch mixed signal, wherein a phase difference between phases of the I-branch local oscillation signal and the Q-branch local oscillation signal equals the relative phase difference;
an I-branch low pass filter, coupled to the I-branch mixer, for filtering the I-branch mixed signal to provide the I-branch intermediate signal; and
a Q-branch low pass filter, coupled to the Q-branch mixer, for filtering the Q-branch mixed signal to provide the Q-branch intermediate signal.

9. The wireless receiver as claimed in claim 8, wherein the I-branch low pass filter and the Q-branch low pass filter are active real low pass filters equipped with programmable gain control functionality.

10. The wireless receiver as claimed in claim 7, wherein the relative phase difference is ninety degrees.

11. The wireless receiver as claimed in claim 2, wherein a bandwidth of the low pass filter covers the plurality of intermediate bands.

12. A wireless receiver for receiving a plurality of co-existing wireless signals from different positioning systems, comprising:
a mixer, for mixing the plurality of the co-existing wireless signals with a local oscillation signal of a local frequency to provide a mixed signal;
a low pass filter, coupled to the mixer, for filtering the mixed signal to provide an intermediate signal, wherein the intermediate signal comprises a plurality of intermediate bands respectively converted from bands of the plurality of co-existing wireless signals by the local frequency;
an analog-to-digital converting unit, coupled to the low pass filter, for converting the intermediate signal to a digital signal, wherein an operation band of the analog-to-digital converting unit covers the plurality of intermediate bands; and
a digital block, coupled to the analog-to-digital converting unit, for retrieving a plurality of baseband signals respectively in response to the plurality of intermediate bands;
wherein the baseband signals comprise a plurality of I-branch baseband signals and a plurality of Q-branch baseband signals, and the digital block is further arranged to map a first one of the I-branch baseband signals and a first one of the Q-branch baseband signals respectively to a real portion and an imaginary portion of a first constellation, and to map a second one of the I-branch baseband signals and a second one of the Q-branch baseband signals respectively to a real portion and a negative imaginary portion of a second constellation.

13. The wireless receiver as claimed in claim 12, wherein the digital block comprises a processing portion for providing a location information in response to data respectively embedded in the retrieved baseband signals.

14. The wireless receiver as claimed in claim 13, wherein the processing portion is arranged to process the retrieved baseband signals by spreading codes of the different positioning systems to obtain the data.

15. A wireless receiver for receiving a plurality of co-existing wireless signals from different positioning systems, comprising:
an I-branch mixer, for mixing the plurality of the co-existing wireless signals with an I-branch local oscillation signal of a local frequency to provide an I-branch mixed signal;
a Q-branch mixer, for mixing the plurality of the co-existing wireless signals with a Q-branch local oscillation signal of the local frequency to provide a Q-branch mixed signal; wherein a phase of the I-branch local oscillation signal is different from the Q-branch local oscillation signal;
an I-branch low pass filter, coupled to the I-branch mixer, for filtering the I-branch mixed signal to provide an I-branch intermediate signal which comprises a plurality of I-branch intermediate bands respectively converted from bands of the plurality of co-existing wireless signals by the I-branch local oscillation signal;

a Q-branch low pass filter, coupled to the Q-branch mixer, for filtering the Q-branch mixed signal to provide a Q-branch intermediate signal which comprises a plurality of Q-branch intermediate bands respectively converted from the bands of the plurality of co-existing wireless signals by the Q-branch local oscillation signal;

an I-branch analog-to-digital converter, for converting the I-branch intermediate signal to an I-branch digital signal;

a Q-branch analog-to-digital converter, for converting the Q-branch intermediate signal to a Q-branch digital signal; and a digital block coupled to the I-branch analog-to-digital converter and the Q-branch analog-to-digital converter, for retrieving a plurality of I-branch baseband signals respectively corresponding to the plurality of positioning systems from the I-branch digital signal, and retrieving a plurality of Q-branch baseband signals respectively corresponding to the plurality of positioning systems from the Q-branch digital signal, and mapping a first one of the retrieved I-branch baseband signals and a first one of the retrieved Q-branch baseband signal respectively to a real portion and an imaginary portion of a first constellation, and mapping a second one of the retrieved I-branch baseband signals and a second one of the retrieved Q-branch baseband signals respectively to a real portion and a negative imaginary portion of a second constellation.

16. The wireless receiver as claimed in claim 15, wherein the digital block comprises a processing portion for providing a location information in response to data respectively embedded in the retrieved I-branch baseband signals and the retrieved Q-branch baseband signals.

17. The wireless receiver as claimed in claim 16, wherein the processing portion is arranged to process the retrieved I-branch baseband signals and Q-branch baseband signals by spreading codes of the different positioning systems to obtain the data.

18. The wireless receiver as claimed in claim 15, wherein the phase of the I-branch local oscillation signal is different from that of the Q-branch local oscillation signal by ninety degrees.

* * * * *